(12) United States Patent
Wang et al.

(10) Patent No.: US 12,130,763 B2
(45) Date of Patent: Oct. 29, 2024

(54) STORAGE ENCLOSURE AND SYSTEM INCLUDING THE STORAGE ENCLOSURE

(71) Applicant: MITAC COMPUTING TECHNOLOGY CORPORATION, Taoyuan (TW)

(72) Inventors: Jyun-Jie Wang, Taoyuan (TW); Shao-Che Chang, Taoyuan (TW); Cheng-Tung Wang, Taoyuan (TW); Yen-Lun Tseng, Taoyuan (TW); Chin-Hung Tan, Taoyuan (TW)

(73) Assignee: MITAC COMPUTING TECHNOLOGY CORPORATION (TW)

( * ) Notice: Subject to any disclaimer, the term of this patent is extended or adjusted under 35 U.S.C. 154(b) by 212 days.

(21) Appl. No.: 18/066,040

(22) Filed: Dec. 14, 2022

(65) Prior Publication Data

US 2023/0195671 A1 Jun. 22, 2023

(30) Foreign Application Priority Data

Dec. 16, 2021 (TW) .................................. 110147166

(51) Int. Cl.
*G06F 13/38* (2006.01)
*H04L 41/0226* (2022.01)
*H04L 67/1097* (2022.01)

(52) U.S. Cl.
CPC ........ *G06F 13/385* (2013.01); *H04L 41/0226* (2013.01); *H04L 67/1097* (2013.01)

(58) Field of Classification Search
CPC ............... G06F 13/385; H04L 41/0226; H04L 67/1097
See application file for complete search history.

(56) References Cited

U.S. PATENT DOCUMENTS 9,043,777 B2 * 5/2015 Guo ........................ G06F 8/65
717/168
10,521,376 B1 * 12/2019 Mitra .................... G06F 3/0632
(Continued)

OTHER PUBLICATIONS

Search Report appended to an Office Action, which was issued to Taiwanese counterpart application No. 110147166 by the TIPO on Jan. 10, 2023 (2 pages including English translation).

*Primary Examiner* — Henry Tsai
*Assistant Examiner* — Christopher A Daley
(74) *Attorney, Agent, or Firm* — Michael Best & Friedrich LLP (57) ABSTRACT

A storage enclosure connected to a server via an external network and includes a network switch, an expander that is connected to the network switch and that is configured to generate enclosure data that supports a format conforming with SCSI Enclosure Services, and a board management controller (BMC) that is connected to the network switch and the expander. The BMC is configured to translate the enclosure data into enclosure translating data that supports a Redfish® format. The expander is configured to, after generating the enclosure data, transmit the enclosure data through the network switch to the BMC via an internal network. The BMC is configured to translate the enclosure data into the enclosure translating data, and to transmit the enclosure translating data to the network switch. The network switch transmits the enclosure translating data to the server through the external network.

20 Claims, 6 Drawing Sheets

(56) References Cited

U.S. PATENT DOCUMENTS

| | | | |
|---|---|---|---|
| 11,604,756 B1* | 3/2023 | Lambert | G06F 13/4282 |
| 11,921,741 B2* | 3/2024 | Shih | G06F 16/9566 |
| 2011/0283006 A1* | 11/2011 | Ramamurthy | H04L 41/344 |
| | | | 709/228 |
| 2017/0139592 A1* | 5/2017 | Qin | G06F 3/061 |
| 2017/0180216 A1* | 6/2017 | Peng | H04L 49/15 |
| 2017/0344294 A1* | 11/2017 | Mishra | G06F 3/0659 |
| 2018/0173516 A1* | 6/2018 | Tung | G06F 8/654 |
| 2019/0004901 A1* | 1/2019 | Ryan | G06F 1/3253 |
| 2019/0050351 A1* | 2/2019 | Sahu | G06F 3/0604 |

* cited by examiner

The expander transmits the enclosure data via the SAS port to the server using the SAS cable ~61

FIG. 6

The server transmits the external data via the SAS HBA to the expander using the SAS cable ~71

FIG. 7

The expander transmits the troubleshooting data via the first MAC port to the first RGMII port of the network switch ~81

The network switch transmits the troubleshooting data, using the second MDI port, to the server through the external network. ~82

FIG. 8

STORAGE ENCLOSURE AND SYSTEM INCLUDING THE STORAGE ENCLOSURE

CROSS-REFERENCE TO RELATED APPLICATION

This application claims priority to Taiwanese Invention Patent Application No. 110147166, filed on Dec. 16, 2021.

FIELD

The disclosure relates to a storage enclosure, and more particularly to a storage enclosure that is configured to be manageable in one of an out-of-band management mode and an in-band management mode, and a system that includes the storage.

BACKGROUND

In the field of managing a Small Computer System Interface (SCSI) enclosure product such as a just a bunch of disks (JBOD) enclosure, a Serial Attached SCSI (SAS) expander is typically employed. In use, the SAS expander is configured to record a status of the JBOD enclosure such as a status of a hard disk drive (HDD) included in the JBOD enclosure, a status of a power supply of the JBOD enclosure, a status of one or more fans of the JBOD enclosure, a status of an input/output (I/O) module of the JBOD enclosure, or a status of one or more power cables, and to control various aspects of the JBOD enclosure such as a light-emitting diode associated with the HDD (HDD LED), a speed of the fans, etc.

The SCSI Enclosure Services (SES) is a protocol that is typically used for managing enclosure products. The SES has a set of SCSI commands that allows a host server to communicate with the enclosure products such as requesting a return of a message, transmitting a control command, etc. The host server is typically installed with a host bus adapter (HBA) card or a redundant array of independent disks (RAID) adapter so as to be enabled to connect to an external SAS JBOD enclosure via an external SAS cable. The SES is typically provided with an interface (known as a diagnosis page) for enabling the host server to manage the SAS JBOD enclosure, and in use, data is transmitted via the SAS cable, such that the status of the SAS JBOD enclosure is transmitted via the SAS cable to the main server, and data may be transmitted from the host server via the SAS cable to the SAS JBOD enclosure and stored therein. This manner of management of the SAS JBOD enclosure is known as in-band management.

It is noted that since the SAS JBOD enclosure is typically deployed under the host server, a user is required to have access to the main server in order to obtain the status of the SAS JBOD enclosure. That is to say, when the main server is shut down or under external attacks, the user would not be able to manage the SAS JBOD enclosure using in-band management. To address this issue, out-of-band management was proposed. In use, the SAS JBOD enclosure may be connected to, for example, an Ethernet network via an Ethernet interface. As such, the user may manage the SAS JBOD enclosure remotely, without accessing the main server.

The Redfish standard includes a suite of specifications that provides an industry standard protocol for out-of-band management of servers and storages. In use, the content of the SES diagnosis page needs to be convert into a format that conforms with the Redfish standard in order for the user to remotely implement out-of-band management using the Redfish standard. This task is considered difficult for the SAS expander, whose chipset is typically equipped with limited computing capabilities. As such, some personnel still prefer to implement in-band management, reserving the Ethernet interface for a troubleshooting (debug) port that is configured to transmit data related to troubleshooting. Additionally, in order to reduce cost, it is common that only one of in-band management and out-of-band management is established for the management of a conventional SAS JBOD enclosure.

SUMMARY

Therefore, one object of the disclosure is to provide a storage enclosure that may enable a user to choose freely between using one of an out-of-band management and an in-band management to perform remote management.

According to one embodiment of the disclosure, the storage enclosure is connected to a server via an external network and includes:
 a network switch;
 an expander that is connected to the network switch and that is configured to generate enclosure data that supports a format conforming with Small Computer System Interface (SCSI) Enclosure Services (SES); and
 a board management controller (BMC) that is connected to the network switch and the expander, and that is configured to translate the enclosure data that supports the format conforming with SES into enclosure translating data that supports a Redfish® format;

The expander is configured to, after generating the enclosure data, transmit the enclosure data through the network switch to the BMC via an internal network.

The BMC is configured to, in response to receipt of the enclosure data, translate the enclosure data into the enclosure translating data, and transmit the enclosure translating data to the network switch.

The network switch is configured to, in response to receipt of the enclosure translating data, transmit the enclosure translating data to the server through the external network.

Another object of the disclosure is to provide a system that includes the above-mentioned storage enclosure.

According to one embodiment of the disclosure, the system includes a storage enclosure and a server connected to the storage enclosure via an external network, the storage enclosure including:
 a network switch;
 an expander that is connected to the network switch and that is configured to generate enclosure data that supports a format conforming with Small Computer System Interface (SCSI) Enclosure Services (SES); and
 a board management controller (BMC) that is connected to the network switch and the expander, and that is configured to translate the enclosure data that supports the format conforming with SES into enclosure translating data that supports a Redfish® format.

The expander is configured to, after generating the enclosure data, transmit the enclosure data through the network switch to the BMC via an internal network.

The BMC is configured to, in response to receipt of the enclosure data, translate the enclosure data into the enclosure translating data, and transmit the enclosure translating data to the network switch.

The network switch is configured to, in response to receipt of the enclosure translating data, transmit the enclosure translating data to the server through the external network.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 1:
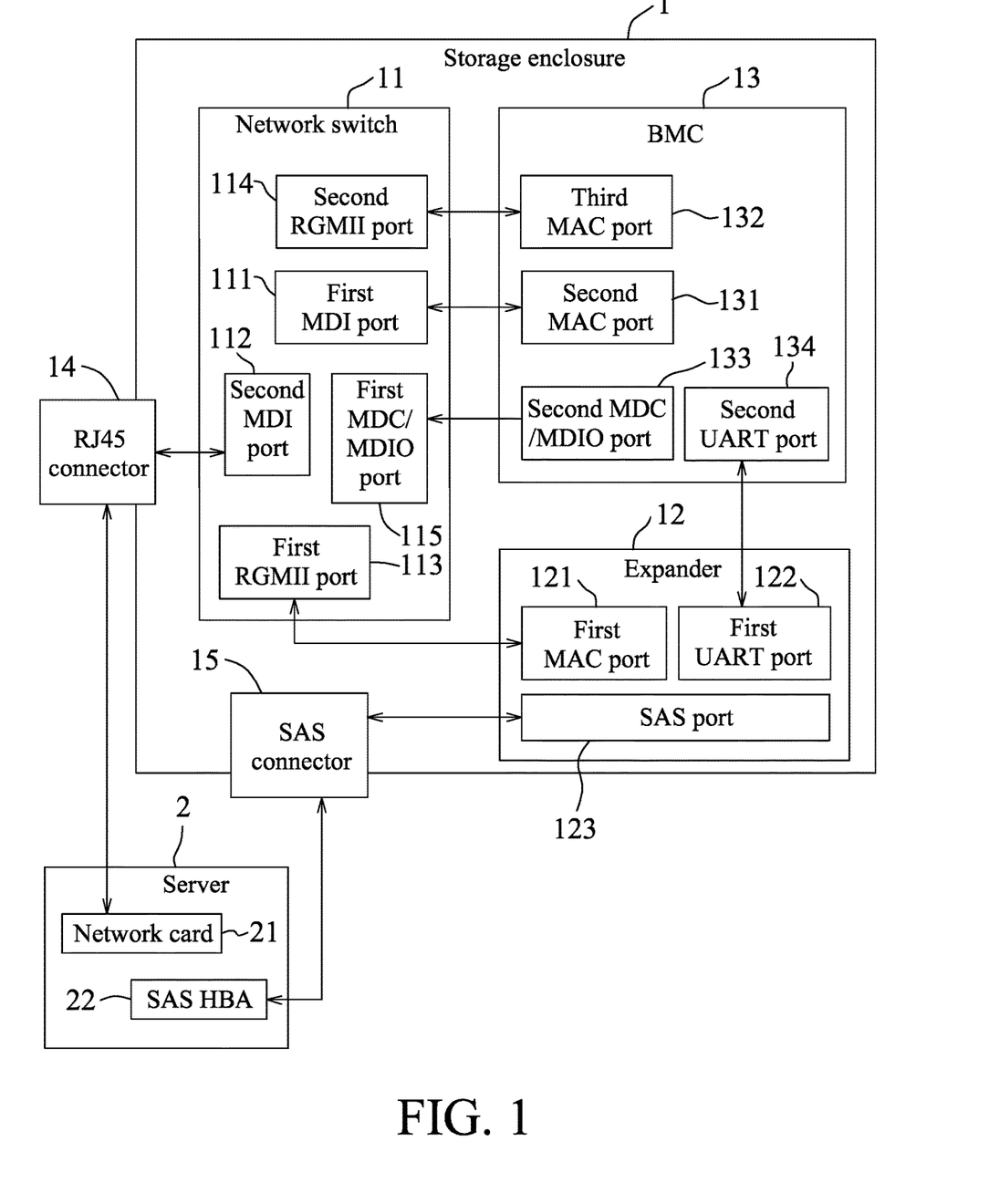
FIG. 1 is a block diagram illustrating a storage enclosure and a server according to one embodiment of the disclosure.

FIG. 1 is a block diagram illustrating a storage enclosure 1 according to one embodiment of the disclosure. In this embodiment, the storage enclosure 1 is connected to a server 2 via an external network.

The storage enclosure 1 includes a network switch 11, an expander 12 that is connected to the network switch 11, and a board management controller (BMC) 13 that is electronically connected to the network switch 11 and the expander 12.

The server 2 includes a network card 21 and a Serial Attached SCSI (SAS) host bus adapter (HBA) 22. In some embodiments, the server 2 may further include a processor, a memory module, and a communication unit. It is noted that in this embodiment, the server 2 is embodied using a host server, but is not limited as such.

The processor may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The memory module may be embodied using, for example, random access memory (RAM), read only memory (ROM), programmable ROM (PROM), firmware, and/or flash memory, etc.

The communication unit may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like.

The network switch 11 includes a first medium dependent interface (MDI) port 111, a second MDI port 112, a first reduced gigabit media independent interface (RGMII) port 113, a second RGMII port 114, and a first Management Data Clock/Management Data Input/Output (MDC/MDIO) port 115.

In this embodiment, the network switch 11 is configured to operate in one of an out-of-band management mode and an in-band management mode. When operating in the out-of-band management mode, the network switch 11 is configured to serve as an intermediate to enable an internal connection between the BMC 13 and the expander 12, and enable an external connection between the BMC 13 and the server 2. When operating in the in-band management mode, the network switch 11 is configured to serve as an intermediate to enable an external connection to be established between the expander 12 and the server 2.

It is noted that the internal connection may be implemented using an internal network that conforms with the connection protocols associated with the ports included in the network switch 11, the expander 12 and the BMC 13, and the external connection may be implemented using an external network (e.g., the Internet Protocol (IP)). In use, the second MDI port 112 of the network switch 11 may be connected to the network card 21 of the server 2 using an RJ45 connector 14 and an Ethernet interface of the network card 21, and this connection serves as a part of the external connection.

The expander 12 includes a first media access control (MAC) port 121, a first universal asynchronous receiver/transmitter (UART) port 122, and a SAS port 123. In use, the expander 12 is configured to generate enclosure data that supports a format that conforms with the SCSI Enclosure Services (SES).

The expander 12 is configured to operate in one of the out-of-band management mode and the in-band management mode. When the expander 12 operates in the out-of-band management mode, the internal connection between the expander 12 and the BMC 13 using the internal network is established through the network switch 11. When the expander 12 operates in the in-band management mode, the external connection between the expander 12 and the server 2 using the external network is established through the network switch 11. Additionally, the expander 12 and the server 2 are connected using an SAS cable (not depicted in the drawings) that interconnects an SAS connector 15 and the SAS HBA 22. The SAS connector 15 is included in the storage enclosure 1 and is connected to the SAS port 123 of the expander 12.

Specifically, when the expander 12 operates in the out-of-band management mode, the internal connection between the expander 12 and the BMC 13 is established by connecting the first MAC port 121 of the expander 12 to the first RGMII port 113 of the network switch 11. Furthermore, data received by the network switch 11 through the first RGMII port 113 is transmitted using the internal network through the first MDI port 111. On the other hand, when the expander 12 operates in the in-band management mode, the external connection between the expander 12 and the server 2 is established by connecting the first MAC port 121 of the expander 12 to the first RGMII port 113 of the network switch 11. Furthermore, data received by the network switch 11 through the first RGMII port 113 is transmitted using the external network through the second MDI port 112.

The BMC 13 includes a second MAC port 131, a third MAC port 132, a second MDC/MDIO port 133, and a second UART port 134. In use, the BMC 13 is configured to translate the enclosure data that supports the format conforming with SES into enclosure translating data that supports a Redfish® format, and is configured to translate data that supports the Redfish® format to data that supports the format conforming with SES.

The BMC 13 is configured to operate in one of the out-of-band management mode and the in-band management mode. When the BMC 13 operates in the out-of-band management mode, the internal connection between the BMC 13 and the expander 12 using the internal network through the network switch 11 is established, and the external connection between the BMC 13 and the server 2 is established through the network switch 11. When the BMC 13 operates in the in-band management mode, no connection between the BMC 13 and the expander 12 is established using the network switch 11.

Specifically, when the BMC 13 operates in the out-of-band management mode, the internal connection between the expander 12 and the BMC 13 is established by connecting the second MAC port 131 of the BMC 13 to the first MDI port 111 of the network switch 11, and the external connection between the BMC 13 and the server 2 is established by connecting the third MAC port 132 of the BMC 13 to the second RGMII port 114 of the network switch 11.

For the storage enclosure 1, the components (the network switch 11, the expander 12 and the BMC 13) may be controlled by the server 2 to operate in one of the out-of-band management mode and the in-band management mode, and the storage enclosure 1 may thus operate in the one of the out-of-band management mode and the in-band management mode. Specifically, the expander 12 is configured to, in response to receipt of a command from the server 2 via the SAS cable that instructs the expander 12 to operate in one of the out-of-band management mode and the in-band management mode, proceed to operate in the one of the out-of-band management mode and the in-band management mode, and transmit a message to the second UART port 134 of the BMC 13 via the first UART port 122. The message instructs the BMC 13 to operate in the one of the out-of-band management mode and the in-band management mode. The BMC 13 is configured to, in response to receipt of the message, proceed to operate in the one of the out-of-band management mode and the in-band management mode, and transmit an instruction to the first MDC/MDIO port 115 of the network switch 11 via the second MDC/MDIO port 133. The instruction instructs the network switch 11 to operate in the one of the out-of-band management mode and the in-band management mode. In response to receipt of the instruction, the network switch 11 is configured to proceed to operate in the one of the out-of-band management mode and the in-band management mode.

Figure 2:
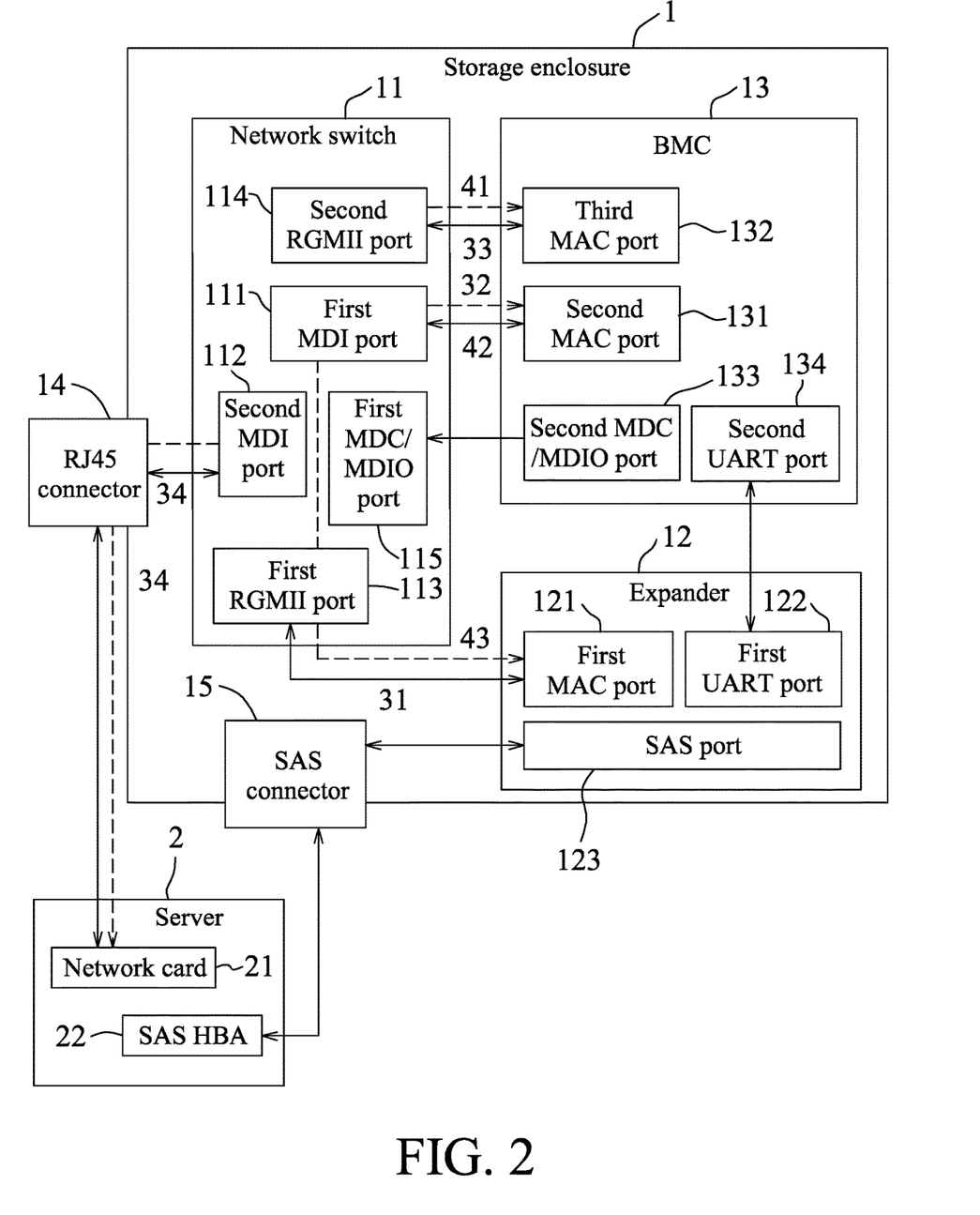
FIG. 2 is a block diagram of the storage enclosure and the server, illustrating data transmission when the storage enclosure is operating in an out-of-band management mode according to one embodiment of the disclosure.

FIG. 2 is a block diagram of the storage enclosure 1 and the server 2, illustrating data transmission when the storage enclosure 1 is operating in the out-of-band management mode according to one embodiment of the disclosure.

Figure 3:
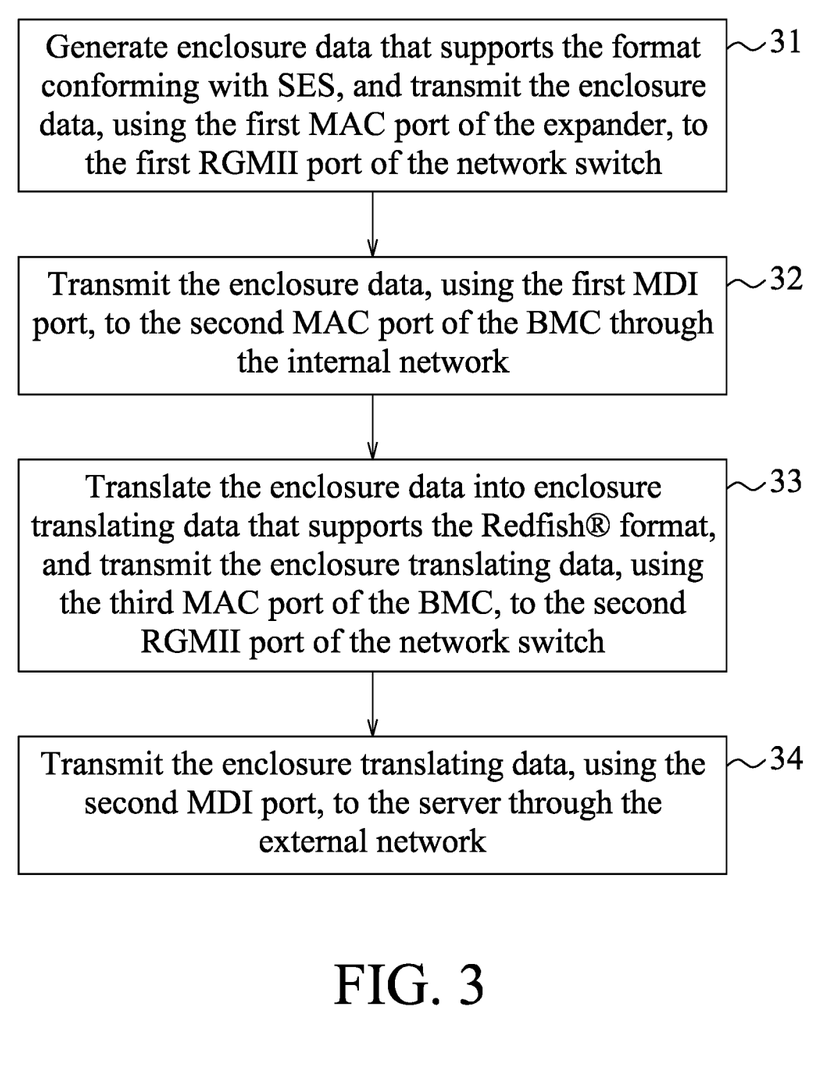
FIG. 3 is a flow chart illustrating steps of an enclosure data transmission process of a method of management of the storage enclosure in the out-of-band management mode according to one embodiment of the disclosure.

FIG. 3 is a flow chart illustrating steps of an enclosure data transmission process of a method of management of the storage enclosure 1 in the out-of-band management mode according to one embodiment of the disclosure. In this embodiment, the enclosure data transmission process is implemented by the storage enclosure 1 and the server 2 as shown in the embodiment of FIG. 2, and involves transmitting data from the storage enclosure 1 to the server 2.

In step 31, the expander 12 generates enclosure data that supports the format conforming with SES, and transmits the enclosure data, using the first MAC port 121 of the expander 12, to the first RGMII port 113 of the network switch 11. As such, the enclosure data is available to be transmitted to the BMC 13 using the network switch 11.

In step 32, in response to receipt of the enclosure data via the first RGMII port 113, the network switch 11 transmits the enclosure data, using the first MDI port 111, to the second MAC port 131 of the BMC 13 through the internal network. As such, the enclosure data is transmitted from the expander 12 to the BMC 13.

In step 33, in response to receipt of the enclosure data via the second MAC port 131 through the internal network, the BMC 13 translates the enclosure data into enclosure translating data that supports the Redfish® format, and transmits the enclosure translating data, using the third MAC port 132 of the BMC 13, to the second RGMII port 114 of the network switch 11. As such, the network switch 11 is ready to transmit the enclosure translating data to the server 2.

In step 34, in response to receipt of the enclosure translating data via the second RGMII port 114, the network switch 11 transmits the enclosure translating data, using the second MDI port 112, to the server 2 through the external network.

In one alternative embodiment, the network switch 11 is configured to, in response to receipt of the enclosure data, transmit the enclosure data using the first MDI port 111 through the internal network, and in response to receipt of the enclosure translating data, transmit data using the second MDI port 112 through the external network.

It is noted that, in this embodiment, the network switch 11 is configured to transmit data based on a port from which data is received. Specifically, in the case that the network switch 11 receives data from the first RGMII port 113, the network switch 11 is configured to transmit the data using the first MDI port 111 through the internal network. On the other hand, in the case that the network switch 11 receives data from the second RGMII port 114, the network switch 11 is configured to transmit the data using the second MDI port 112 through the external network. However, in other embodiments, the network switch 11 is configured to detect an address associated with the received data (e.g., the enclosure data or the enclosure translating data). In the case that the address associated with the received data is determined to indicate that the received data is received via the internal network, the network switch 11 is configured to transmit the received data using the first MDI port 111 through the internal network. On the other hand, in the case that the address associated with the received data is determined to indicate that the received data is not received via the internal network (i.e., the data is determined to be received via the external network), the network switch 11 is configured to transmit the received data using the second MDI port 112 through the external network.

Figure 4:
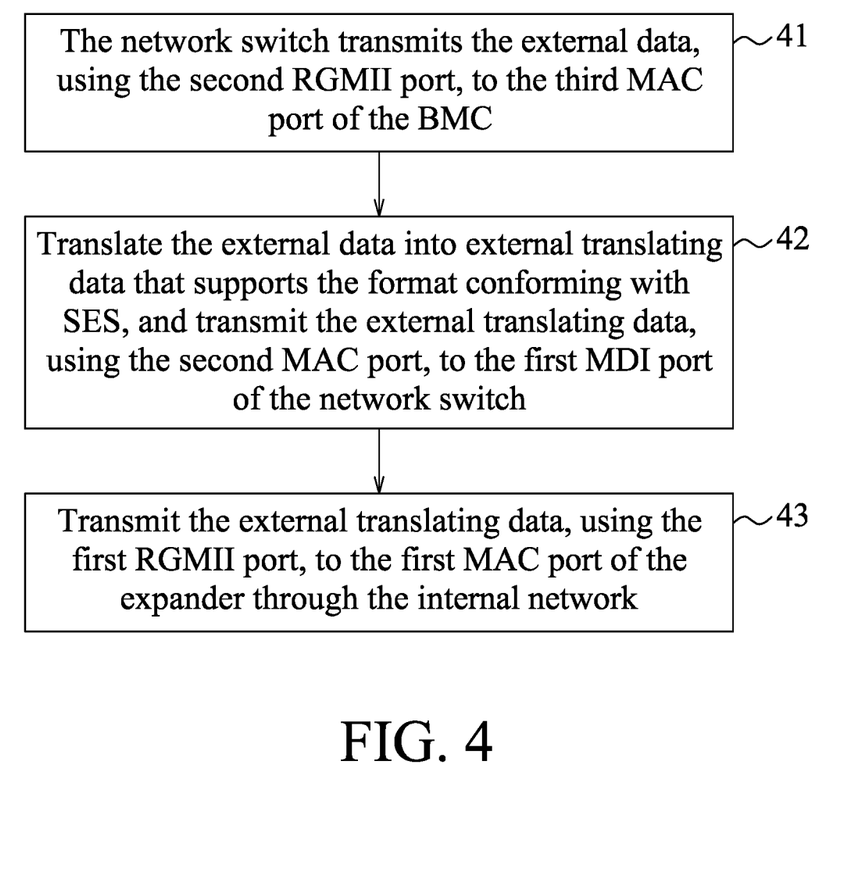
FIG. 4 is a flow chart illustrating steps of an external data transmission process of a method of management of the storage enclosure in the out-of-band management mode according to one embodiment of the disclosure.

FIG. 4 is a flow chart illustrating steps of an external data transmission process of a method of management of the storage enclosure 1 in the out-of-band management mode according to one embodiment of the disclosure. In this embodiment, the external data transmission process is implemented by the storage enclosure 1 and the server 2 as shown in the embodiment of FIG. 2, and involves transmitting external data received from the server 2 to the expander 12. It is noted that in the embodiments, the term "external data" refers to data transmitted by the server 2 that supports the Redfish® format.

In step 41, in response to receipt of external data from the server 2 via the second MDI port 112 through the external network, the network switch 11 transmits the external data, using the second RGMII port 114, to the third MAC port 132 of the BMC 13.

In step 42, in response to receipt of external data via the third MAC port 132, the BMC 13 translates the external data into external translating data that supports the format conforming with SES. Then, the BMC 13 transmits the external translating data, using the second MAC port 131, to the first MDI port 111 of the network switch 11. As such, the external translating data is available to be transmitted to the expander 12 using the network switch 11.

In step 43, in response to receipt of the external translating data via the first MDI port 111, the network switch 11 transmits the external translating data, using the first RGMII port 113, to the first MAC port 121 of the expander 12 through the internal network.

It is noted that, in this embodiment, the network switch 11 is configured to transmit data based on a port from which data is received. Specifically, in the case that the network switch 11 receives data from the first MDI port 111 through the internal network, the network switch 11 is configured to transmit the data using the first RGMII port 113. On the other hand, in the case that the network switch 11 receives data from the second MDI port 112 through the external network, the network switch 11 is configured to transmit the data using the second RGMII port 114. However, in other embodiments, the network switch 11 is configured to detect an address associated with the received data (e.g., the external data or the external translating data) to determine how to transmit the received data (i.e., using the first RGMII port 113 or the second RGMII port 114 to transmit the received data). In the case that the address associated with the received data is determined to indicate that the received data is received via the internal network, the network switch 11 is configured to transmit the received data using the first RGMII port 113. On the other hand, in the case that the address associated with the received data is determined to indicate that the received data is not received via the internal network (e.g., the address is determined to be received via the external network), the network switch 11 is configured to transmit the received data using the second RGMII port 114.

In brief, using the above-mentioned enclosure data transmission process and the external data transmission process, the storage enclosure 1 may be configured to operate in the out-of-band management mode, in which the enclosure data generated by the expander 12 may be transmitted to the BMC 13 using the internal network, and the BMC 13 is configured to translate the enclosure data into enclosure translating data that supports the Redfish® format. As such, the enclosure translating data is available to be transmitted to the server 2 using the external network. In this manner, an Ethernet interface of the server 2 may be used by a user to remotely manage the storage enclosure 1 using out-of-band management, in addition to being used as a troubleshooting (debug) port. It is noted that in other embodiments, using the out-of-band management, the user is enabled to operate other electronic device other than the server 2 to perform the managing of the storage enclosure 1 through the RJ45 connector 14.

Figure 5:
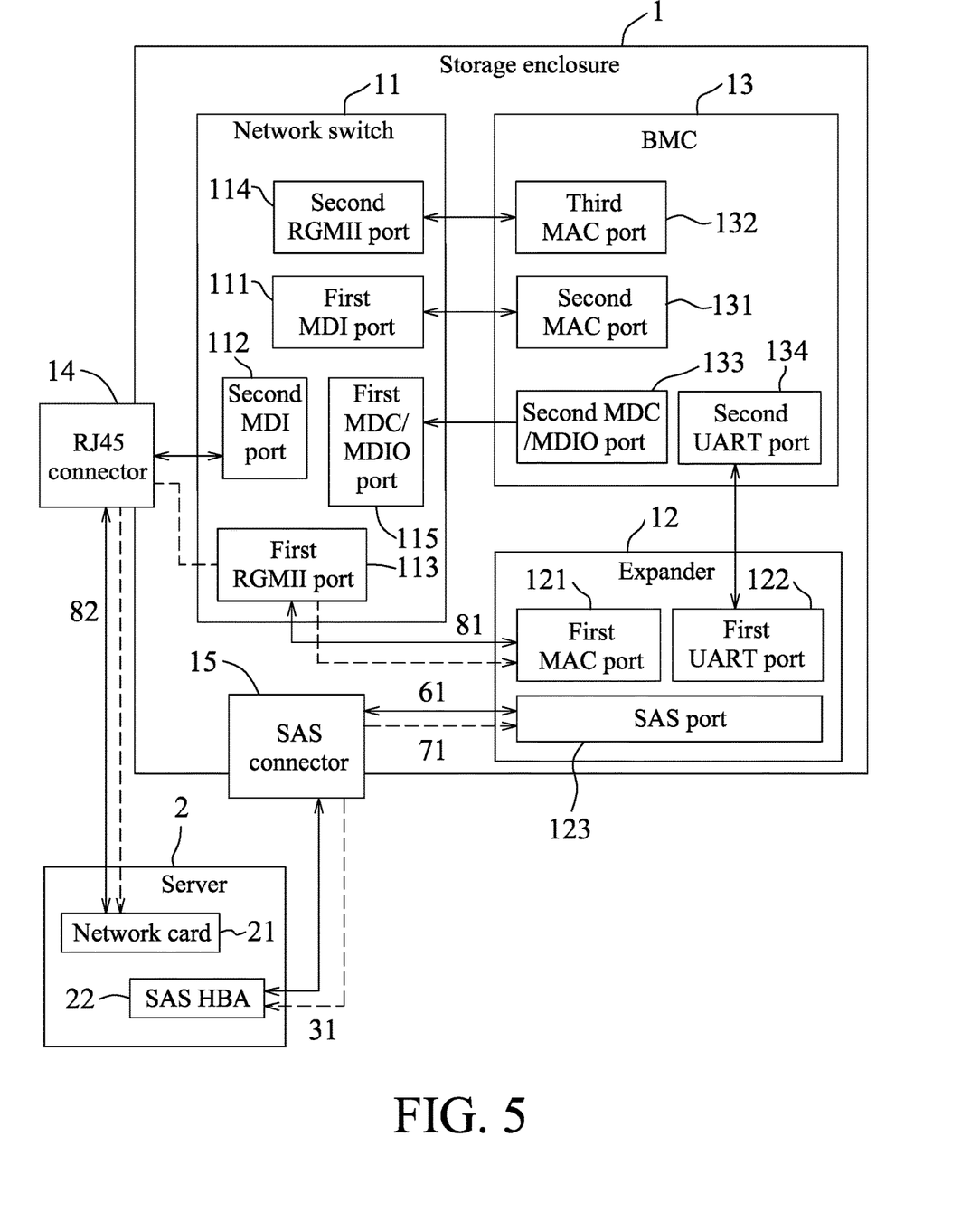
FIG. 5 is a block diagram of the storage enclosure and the server, illustrating data transmission when the storage enclosure is operating in an in-band management mode according to one embodiment of the disclosure.

FIG. 5 is a block diagram of the storage enclosure 1 and the server 2, illustrating data transmission when the storage enclosure 1 is operating in the in-band management mode according to one embodiment of the disclosure. It is noted that, when the user intends to manage the storage enclosure 1 in the in-band management mode, he/she may operate the server 2 to transmit the command to the storage enclosure 1 using the SAS cable.

Figure 6:
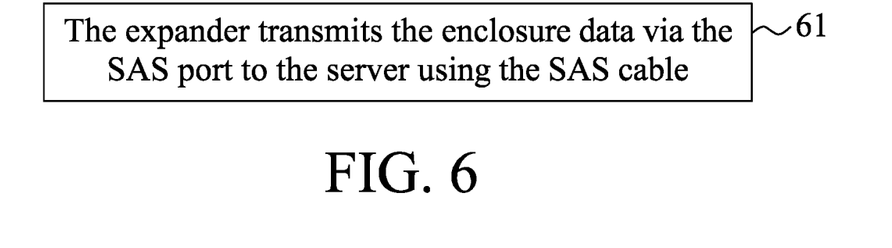
FIG. 6 is a flow chart illustrating a step of an enclosure data transmission process of a method of management of the storage enclosure in the in-band management mode according to one embodiment of the disclosure.

FIG. 6 is a flow chart illustrating a step of an enclosure data transmission process of a method of management of the storage enclosure 1 in the in-band management mode according to one embodiment of the disclosure. In this embodiment, the enclosure data transmission process is implemented by the storage enclosure 1 and the server 2 as shown in the embodiment of FIG. 5, and involves transmitting data from the storage enclosure 1 to the server 2.

Specifically, after generating the enclosure data, in step 61, the expander 12 transmits the enclosure data via the SAS port 123 to the server 2 using the SAS cable.

Figure 7:
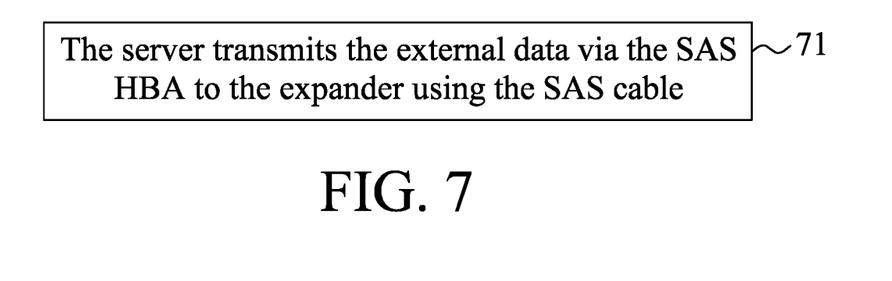
FIG. 7 is a flow chart illustrating a step of an external data transmission process of a method of management of the storage enclosure in the in-band management mode according to one embodiment of the disclosure.

FIG. 7 is a flow chart illustrating a step of an external data transmission process of a method of management of the storage enclosure 1 in the in-band management mode according to one embodiment of the disclosure. In this embodiment, the external data transmission process is implemented by the storage enclosure 1 and the server 2 as shown in the embodiment of FIG. 5, and involves transmitting external data that supports the SCSI enclosure service format from the server 2 to the storage enclosure 1.

Specifically, after generating the external data, in step 71, the server 2 transmits the external data via the SAS HBA 22 to the expander 12 using the SAS cable.

Figure 8:
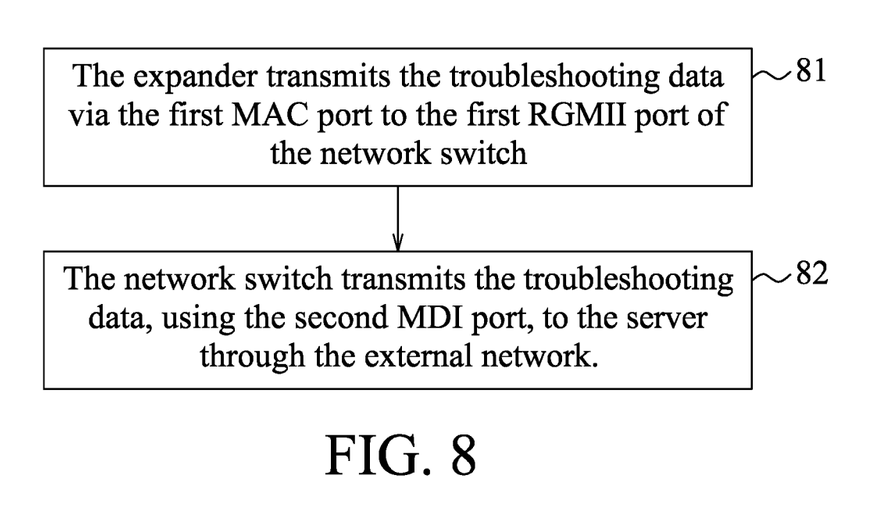
FIG. 8 is a flow chart illustrating steps of a troubleshooting data transmission process of a method of management of the storage enclosure in the in-band management mode according to one embodiment of the disclosure.

FIG. 8 is a flow chart illustrating steps of a troubleshooting data transmission process of a method of management of the storage enclosure 1 in the in-band management mode according to one embodiment of the disclosure. In this embodiment, the troubleshooting data transmission process is implemented by the storage enclosure 1 and the server 2 as shown in the embodiment of FIG. 5, and involves transmitting troubleshooting data from the storage enclosure 1 to the server 2.

Specifically, the troubleshooting data may be gathered by the expander 12 automatically, or generated by the expander 12 in response to receipt of a request from the server 2. After generating the troubleshooting data, in step 81, the expander 12 transmits the troubleshooting data via the first MAC port 121 to the first RGMII port 113 of the network switch 11. As such, the troubleshooting data is available to be transmitted by the network switch 11 to the server 2.

Then, in step 82, in response to receipt of the troubleshooting data via the first RGMII port 113, the network switch 11 transmits the troubleshooting data, using the second MDI port 112, to the server 2 through the external network.

In brief, by using the above-mentioned enclosure data transmission process, the external data transmission process and the troubleshooting data transmission process, the storage enclosure 1 may be configured to operate in the in-band management mode, in which the enclosure data and the external data may be transmitted between the storage enclosure 1 and the server 2 via the SAS cable. In this manner, the Ethernet interface of the server 2 may be used as a troubleshooting (debug) port.

In sum, the embodiments of the disclosure provide a storage enclosure 1 that is controllable to operate in one of the out-of-band management mode and the in-band management mode. When operating in the out-of-band management mode, the enclosure data may be transmitted to the BMC 13, which is configured to translate the enclosure data into enclosure translating data that supports the Redfish® format. As such, the enclosure translating data is available to be transmitted to the server 2 by the network switch 11 using the external network. Alternatively, when the user intends to manage the storage enclosure 1 in the in-band management mode, he/she may operate the server 2 to transmit the command to the storage enclosure 1, so as to control the storage enclosure to operate in the in-band management mode. As such, the storage enclosure 1 is configured to be managed using one of the out-of-band management mode and the in-band management mode, depending on the user's choice.

According to one embodiment of the disclosure, there is provided a system that includes a storage enclosure 1 and a server 2, exemplified in FIG. 1. The system is configured such that a user is enabled to operate the server 2 to transmit a command to the storage enclosure 1, so as to control the storage enclosure 1 to operate in one of the out-of-band management mode and the in-band management mode. That is to say, the system provides the operations of both of the out-of-band management and the in-band management, and therefore enables a user to choose freely between using one of the out-of-band management and the in-band management to perform remote management of the storage enclosure 1.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A storage enclosure connected to a server via an external network and comprising:
   a network switch;
   an expander that is connected to the network switch and that is configured to generate enclosure data that supports a format conforming with Small Computer System Interface (SCSI) Enclosure Services (SES); and
   a board management controller (BMC) that is connected to the network switch and the expander, and that is configured to translate the enclosure data that supports the format conforming with SES into enclosure translating data that supports a Redfish® format;
   wherein:
      the expander is configured to, after generating the enclosure data, transmit the enclosure data through the network switch to the BMC via an internal network;
      the BMC is configured to, in response to receipt of the enclosure data, translate the enclosure data into the enclosure translating data, and transmit the enclosure translating data to the network switch; and
      the network switch is configured to, in response to receipt of the enclosure translating data, transmit the enclosure translating data to the server through the external network.

2. The storage enclosure as claimed in claim 1, wherein:
   the network switch includes a first medium dependent interface (MDI) port, a second MDI port, a first reduced gigabit media independent interface (RGMII) port, and a second RGMII port;
   the expander includes a first media access control (MAC) port;
   the BMC includes a second MAC port and a third MAC port;
   the expander is configured to transmit the enclosure data, using the first MAC port, to the first RGMII port of the network switch;
   the network switch is configured to, in response to receipt of the enclosure data via the first RGMII port, transmit the enclosure data, using the first MDI port, to the second MAC port of the BMC through the internal network;
   the BMC is configured to, in response to receipt of the enclosure data via the second MAC port through the internal network, translate the enclosure data into the enclosure translating data, and transmit the enclosure translating data, using the third MAC port of the BMC, to the second RGMII port of the network switch; and
   the network switch is configured to, in response to receipt of the enclosure translating data via the second RGMII port, transmit the enclosure translating data, using the second MDI port, to the server through the external network.

3. The storage enclosure as claimed in claim 2, wherein:
   the network switch is configured to, in response to receipt of external data that supports a Redfish® format from the server via the second MDI port through the external network, transmit the external data, using the second RGMII port, to the third MAC port of the BMC;

the BMC is configured to, in response to receipt of the external data via the third MAC port, translate the external data into external translating data that supports the format conforming with SES, and transmit the external translating data, using the second MAC port, to the first MDI port of the network switch;

the network switch is configured to, in response to receipt of the external translating data via the first MDI port, transmit the external translating data, using the first RGMII port, to the first MAC port of the expander through the internal network.

4. The storage enclosure as claimed in claim 1, wherein:
the network switch includes a first medium dependent interface (MDI) port, a second MDI port, a first reduced gigabit media independent interface (RGMII) port, and a second RGMII port;
  in the case that the network switch receives data from the first RGMII port, the network switch is configured to transmit the data using the first MDI port through the internal network; and
  in the case that the network switch receives data from the second RGMII port, the network switch is configured to transmit the data using the second MDI port through the external network.

5. The storage enclosure as claimed in claim 1, wherein:
the network switch includes a first medium dependent interface (MDI) port, a second MDI port, and a first reduced gigabit media independent interface (RGMII) port;
  the expander includes a first media access control (MAC) port;
  the expander is configured to transmit the enclosure data, using the first MAC port, to the first RGMII port of the network switch;
  one of the enclosure data and the enclosure translating data received by the network switch serves as received data;
  the network switch is configured to detect an address associated with the received data;
  in the case that the address associated with the enclosure data indicates that the received data is received via the internal network, the network switch is configured to transmit the received data using the first MDI port through the internal network;
  in the case that the address associated with the received data indicates that the received data is not received via the internal network, the network switch is configured to transmit the received data using the second MDI port through the external network.

6. The storage enclosure as claimed in claim 1, the server including a Serial Attached SCSI (SAS) host bus adapter (HBA), wherein:
the storage enclosure further comprises an SAS connector;
the expander and the SAS HBA of the server are further connected using a Serial Attached SCSI (SAS) cable through the SAS connector;
each of the network switch, the expander and the BMC is configured to operate in one of an out-of-band management mode and an in-band band management mode;
the network switch is configured to, when operating in the out-of-band management mode, serve as an intermediate to enable an internal connection between the BMC and the expander and to enable an external connection between the BMC and the server, and when operating in the in-band band management mode, serve as an intermediate to enable an external connection between the expander and the server;
when the expander operates in the out-of-band management mode, the internal connection between the expander and the BMC via the internal network is established, and when the expander operates in the in-band management mode, the external connection between the expander and the server via the external network is established through the network switch;
when the BMC operates in the out-of-band management mode, the internal connection between the BMC and the expander via the internal network and the external connection between the BMC and the server via the external network are established, and when the BMC operates in the in-band management mode, no connection between the BMC and the expander is established using the network switch.

7. The storage enclosure as claimed in claim 6, wherein:
the expander is configured to, when operating in the out-of-band management mode, transmit the enclosure data to the BMC through the network switch using the internal network, and the BMC is configured to, when operating in the out-of-band management mode, translate the enclosure data into the enclosure translating data, and transmit the enclosure translating data via the network switch to the server using the external network;
the expander is configured to, when operating in the in-band management mode, transmit the enclosure data to the server using the SAS cable.

8. The storage enclosure as claimed in claim 7, wherein:
the network switch includes a first medium dependent interface (MDI) port, a first reduced gigabit media independent interface (RGMII) port, and a second RGMII port;
  the expander includes a first media access control (MAC) port;
  the BMC includes a second MAC port and a third MAC port;
  when the BMC operates in the out-of-band management mode, the internal connection between the expander and the BMC is established by connecting the second MAC port of the BMC to the first MDI port of the network switch, and the external connection between the BMC and the server is established by connecting the third MAC port of the BMC to the second RGMII port of the network switch;
  when the expander operates in the out-of-band management mode, the internal connection between the expander and the BMC is established by connecting the first MAC port of the expander to the first RGMII port of the network switch;
  when the expander operates in the in-band management mode, the external connection between the expander and the server is established by connecting the first MAC port of the expander to the first RGMII port of the network switch.

9. The storage enclosure as claimed in claim 7, wherein:
the expander is further configured to generate troubleshooting data, and when operating in the in-band management mode, transmit the troubleshooting data to the network switch, and the network switch is configured to, in response to receipt of the troubleshooting data, transmit the troubleshooting data to the server through the external network.

10. The storage enclosure as claimed in claim 9, wherein the network switch includes a first medium dependent interface (MDI) port, a second MDI port, and a first reduced gigabit media independent interface (RGMII) port;
the expander includes a first media access control (MAC) port;
the expander is configured to transmit, using the first MAC port, the troubleshooting data to the first RGMII port of the network switch; and
the network switch is configured to, in response to receipt of the troubleshooting data via the first RGMII port, transmit the troubleshooting data, using the second MDI port, to the server through the external network.

11. The storage enclosure as claimed in claim 7, wherein:
the network switch includes a first Management Data Clock/Management Data Input/Output (MDC/MDIO) port;
the expander includes a first universal asynchronous receiver/transmitter (UART) port;
the BMC includes a second MDC/MDIO port and a second UART port;
the expander is configured to, in response to receipt of a command from the server via the SAS cable that instructs the expander to operate in one of the out-of-band management mode and the in-band management mode, proceed to operate in the one of the out-of-band management mode and the in-band management mode, and transmit a message to the second UART port of the BMC via the first UART port, the message instructing the BMC to operate in the one of the out-of-band management mode and the in-band management mode;
the BMC is configured to, in response to receipt of the message, proceed to operate in the one of the out-of-band management mode and the in-band management mode, and transmit an instruction to first MDC/MDIO port of the network switch via the second MDC/MDIO port, the instruction instructing the network switch to operate in the one of the out-of-band management mode and the in-band management mode; and
the network switch is configured to, in response to receipt of the message, proceed to operate in the one of the out-of-band management mode and the in-band management mode.

12. A system comprising a storage enclosure and a server connected to the storage enclosure via an external network, the storage enclosure including:
a network switch;
an expander that is connected to the network switch and that is configured to generate enclosure data that supports a format conforming with Small Computer System Interface (SCSI) Enclosure Services (SES); and
a board management controller (BMC) that is connected to the network switch and the expander, and that is configured to translate the enclosure data that supports the format conforming with SES into enclosure translating data that supports a Redfish® format;
wherein:
the expander is configured to, after generating the enclosure data, transmit the enclosure data through the network switch to the BMC via an internal network;
the BMC is configured to, in response to receipt of the enclosure data, translate the enclosure data into the enclosure translating data, and transmit the enclosure translating data to the network switch; and
the network switch is configured to, in response to receipt of the enclosure translating data, transmit the enclosure translating data to the server through the external network.

13. The system as claimed in claim 12, wherein:
the network switch includes a first medium dependent interface (MDI) port, a second MDI port, a first reduced gigabit media independent interface (RGMII) port, and a second RGMII port;
the expander includes a first media access control (MAC) port;
the BMC includes a second MAC port and a third MAC port;
the expander is configured to transmit the enclosure data, using the first MAC port, to the first RGMII port of the network switch;
the network switch is configured to, in response to receipt of the enclosure data via the first RGMII port, transmit the enclosure data, using the first MDI port, to the second MAC port of the BMC through the internal network;
the BMC is configured to, in response to receipt of the enclosure data via the second MAC port through the internal network, translate the enclosure data into the enclosure translating data, and transmit the enclosure translating data, using the third MAC port of the BMC, to the second RGMII port of the network switch; and
the network switch is configured to, in response to receipt of the enclosure translating data via the second RGMII port, transmit the enclosure translating data, using the second MDI port, to the server through the external network.

14. The system as claimed in claim 13, wherein:
the network switch is configured to, in response to receipt of external data that supports a Redfish® format from the server via the second MDI port through the external network, transmit the external data, using the second RGMII port, to the third MAC port of the BMC;
the BMC is configured to, in response to receipt of the external data via the third MAC port, translate the external data into external translating data that supports the format conforming with SES, and transmit the external translating data, using the second MAC port, to the first MDI port of the network switch;
the network switch is configured to, in response to receipt of the external translating data via the first MDI port, transmit the external translating data, using the first RGMII port, to the first MAC port of the expander through the internal network.

15. The system as claimed in claim 12, wherein:
the network switch includes a first medium dependent interface (MDI) port, a second MDI port, a first reduced gigabit media independent interface (RGMII) port, and a second RGMII port;
in the case that the network switch receives data from the first RGMII port, the network switch is configured to transmit the data using the first MDI port through the internal network; and
in the case that the network switch receives data from the second RGMII port, the network switch is configured to transmit the data using the second MDI port through the external network.

16. The system as claimed in claim 12, wherein:
the network switch includes a first medium dependent interface (MDI) port, a second MDI port, and a first reduced gigabit media independent interface (RGMII) port;
the expander includes a first media access control (MAC) port;
the expander is configured to transmit the enclosure data, using the first MAC port, to the first RGMII port of the network switch;
one of the enclosure data and the enclosure translating data received by the network switch serves as received data;
the network switch is configured to detect an address associated with the received data;
in the case that the address associated with the enclosure data indicates that the received data is received via the internal network, the network switch is configured to transmit the received data using the first MDI port through the internal network;
in the case that the address associated with the received data indicates that the received data is not received via the internal network, the network switch is configured to transmit the received data using the second MDI port through the external network.

17. The system as claimed in claim 12, wherein:
the server includes a Serial Attached SCSI (SAS) host bus adapter (HBA);
the storage enclosure further includes an SAS connector;
the expander and the SAS HBA of the server are further connected using a Serial Attached SCSI (SAS) cable through the SAS connector;
each of the network switch, the expander and the BMC is configured to operate in one of an out-of-band management mode and an in-band band management mode;
the network switch is configured to, when operating in the out-of-band management mode, serve as an intermediate to enable an internal connection between the BMC and the expander and to enable an external connection between the BMC and the server, and when operating in the in-band band management mode, serve as an intermediate to enable an external connection between the expander and the server;
when the expander operates in the out-of-band management mode, the internal connection between the expander and the BMC via the internal network is established, and when the expander operates in the in-band management mode, the external connection between the expander and the server via the external network is established through the network switch;
when the BMC operates in the out-of-band management mode, the internal connection between the BMC and the expander via the internal network and the external connection between the BMC and the server via the external network are established, and when the BMC operates in the in-band management mode, no connection between the BMC and the expander is established using the network switch.

18. The system as claimed in claim 17, wherein:
the expander is configured to, when operating in the out-of-band management mode, transmit the enclosure data to the BMC through the network switch using the internal network, and the BMC is configured to, when operating in the out-of-band management mode, translate the enclosure data into the enclosure translating data, and transmit the enclosure translating data via the network switch to the server using the external network;
the expander is configured to, when operating in the in-band management mode, transmit the enclosure data to the server using the SAS cable.

19. The system as claimed in claim 18, wherein:
the expander is further configured to generate troubleshooting data, and when operating in the in-band management mode, transmit the troubleshooting data to the network switch, and the network switch is configured to, in response to receipt of the troubleshooting data, transmit the troubleshooting data to the server through the external network;
the network switch includes a first medium dependent interface (MDI) port, a second MDI port, and a first reduced gigabit media independent interface (RGMII) port;
the expander includes a first media access control (MAC) port;
the expander is configured to transmit, using the first MAC port, the troubleshooting data to the first RGMII port of the network switch; and
the network switch is configured to, in response to receipt of the troubleshooting data via the first RGMII port, transmit the troubleshooting data, using the second MDI port, to the server through the external network.

20. The system as claimed in claim 18, wherein:
the network switch includes a first Management Data Clock/Management Data Input/Output (MDC/MDIO) port;
the expander includes a first universal asynchronous receiver/transmitter (UART) port;
the BMC includes a second MDC/MDIO port and a second UART port;
the expander is configured to, in response to receipt of a command from the server via the SAS cable that instructs the expander to operate in one of the out-of-band management mode and the in-band management mode, proceed to operate in the one of the out-of-band management mode and the in-band management mode, and transmit a message to the second UART port of the BMC via the first UART port, the message instructing the BMC to operate in the one of the out-of-band management mode and the in-band management mode;
the BMC is configured to, in response to receipt of the message, proceed to operate in the one of the out-of-band management mode and the in-band management mode, and transmit an instruction to first MDC/MDIO port of the network switch via the second MDC/MDIO port, the instruction instructing the network switch to operate in the one of the out-of-band management mode and the in-band management mode; and
the network switch is configured to, in response to receipt of the message, proceed to operate in the one of the out-of-band management mode and the in-band management mode.

* * * * *